United States Patent
Park et al.

(10) Patent No.: US 8,280,418 B2
(45) Date of Patent: Oct. 2, 2012

(54) SYSTEM FOR SUPPORTING VIDEO MESSAGE SERVICE AND METHOD THEREOF

(75) Inventors: Chi Young Park, Seoul (KR); Eun Ju Ahn, Seoul (KR); Tae Jae Kim, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 12/667,000

(22) PCT Filed: May 26, 2008

(86) PCT No.: PCT/KR2008/002924
§ 371 (c)(1),
(2), (4) Date: Sep. 7, 2010

(87) PCT Pub. No.: WO2009/002021
PCT Pub. Date: Dec. 31, 2008

(65) Prior Publication Data
US 2011/0003582 A1      Jan. 6, 2011

(30) Foreign Application Priority Data
Jun. 28, 2007  (KR) .................. 10-2007-0064161

(51) Int. Cl.
*H04W 4/00* (2009.01)
*H04N 7/14* (2006.01)

(52) U.S. Cl. ..... 455/466; 455/410; 455/411; 348/14.01; 348/14.02

(58) Field of Classification Search .................. 455/466, 455/410–411; 348/14.01, 14.02
See application file for complete search history.

(56) References Cited

U.S. PATENT DOCUMENTS

| 6,628,319 | B2 | 9/2003 | Leimkoetter | |
| 6,850,267 | B2* | 2/2005 | Hiroi et al. | 348/14.12 |
| 2002/0044634 | A1 | 4/2002 | Rooke et al. | |
| 2002/0143975 | A1* | 10/2002 | Kimura et al. | 709/231 |
| 2006/0210027 | A1* | 9/2006 | Kafri | 379/88.13 |
| 2006/0234765 | A1* | 10/2006 | Herberger et al. | 455/552.1 |

(Continued)

FOREIGN PATENT DOCUMENTS
JP           2001-217860 A      8/2001
(Continued)

OTHER PUBLICATIONS
International Search Report for PCT/KR2008/002924 filed May 26, 2008.

*Primary Examiner* — Marisol Figueroa
(74) *Attorney, Agent, or Firm* — Sughrue Mion, PLLC

(57) ABSTRACT

A system for supporting a video message service and method thereof is disclosed, a system for supporting a video message service comprises a video message center for when a calling-party mobile terminal is connected via a video call, creating a video message having a preset size based on video data received via the video call according to the reception authentication information of a called-party mobile terminal, and transmitting the created video message using a preset transmission method according to the reception state of the called-party mobile terminal and an authentication server for performing an authentication procedure on the called-party mobile terminal so as to transmit the video message, and provides reception authentication information, based on the results of the authentication procedure, to the video message center.

18 Claims, 6 Drawing Sheets

U.S. PATENT DOCUMENTS

2007/0072642 A1* 3/2007 Kangas et al. ............ 455/552.1
2008/0037762 A1* 2/2008 Shaffer et al. ............ 379/265.09

FOREIGN PATENT DOCUMENTS

| | | |
|---|---|---|
| JP | 2002-041412 A | 2/2002 |
| JP | 2002-314689 A | 10/2002 |
| JP | 2004-056662 A | 2/2004 |
| JP | 2005-204274 A | 7/2005 |
| JP | 2006-252017 A | 9/2006 |
| KR | 1020030069136 A | 8/2003 |
| KR | 1020040090807 A | 10/2004 |
| KR | 1020050068108 A | 7/2005 |
| KR | 1020050088706 A | 9/2005 |
| KR | 1020050090807 A | 9/2005 |
| KR | 1020070014922 A | 2/2007 |
| KR | 1020070023842 A | 3/2007 |
| WO | WO 01/33781 A1 | 5/2001 |

* cited by examiner

SYSTEM FOR SUPPORTING VIDEO MESSAGE SERVICE AND METHOD THEREOF

TECHNICAL FIELD

The present invention relates to a system and method for supporting a video message service.

BACKGROUND ART

With the improvement of the functions of mobile terminals, various functions have been added. In particular, the camera function and multimedia playing function of mobile terminals have been continuously developed with the improvement of the high-resolution digital cameras and display devices, and the realization of ultra high-speed communication.

With the realization of ultra high-speed communication as well as the realization of existing text messaging and voice messaging, such a mobile terminal can provide a multimedia service including video communication, for example, the transmission/reception of various video data or video messages, which corresponds to Audio on Demand (AoD), Video on Demand (VoD), that is, a video message service.

In particular, the mobile terminal can not only capture a user's face or a desired scene using a camera and transmit it in real time, but also take pictures or moving images and transmit them to a counter party's mobile terminal. For this purpose, the mobile terminal uses a Multimedia Message Service (MMS) message or e-mail.

However, a procedure is complex because previously stored video data must be attached to an MMS message or e-mail and then transmitted to a counter party's mobile terminal, and the inconvenience of use occurs because the previously stored video data to be attached must be found separately.

Further, it is difficult to determine whether a counter party's mobile terminal is a model that can receive and then play the video data.

In order to solve the inconvenience of use, research into a system and method capable of simply and efficiently providing a video message service must be continued.

DISCLOSURE

Technical Problem

Accordingly, the present invention has been made keeping in mind the above problems occurring in the prior art, and an object of the present invention is to provide a system and method for supporting a video message service, which is capable of simply accessing a video message center for providing the video message service using a Send key, thereby improving the convenience of users who use the video message service.

Another object of the present invention is to provide a system and method for supporting a video message service, which authenticates a called-party mobile terminal before a video message is created, and then creates a video message having a preset size based on the results of the authentication, thereby flexibly adjusting the size of the video message.

A further object of the present invention is to provide a system and method for supporting a video message service, which checks the reception state of a called-party mobile terminal before a video message is transmitted, and then transmits a created video message via an outbound call or using an MMS message based on the checked reception state, thereby efficiently transmitting the video message.

Yet another object of the present invention is to provide a system and method for supporting a video message service, which authenticates a calling-party mobile terminal accessing a video message center, and then provides one of video message service scenarios which are different from each other based on the results of the authentication, thereby providing the video message service regardless of the type of mobile terminal.

Technical Solution

For this purpose, a system for supporting a video message service according to an aspect of the present invention, including a video message center for, when a calling-party mobile terminal is connected via a video call, creating a video message having a preset size based on video data received via the video call according to the reception authentication information of a called-party mobile terminal, and transmitting the created video message using a preset transmission method according to a reception state of the called-party mobile terminal; and an authentication server for performing an authentication procedure on the called-party mobile terminal so as to transmit the video message, and providing reception authentication information, based on results of the authentication procedure, to the video message center.

A system for supporting a video message service according to another aspect of the present invention, including a video message server for, when a calling-party mobile terminal is connected via a video call, creating a video message having a preset size based on video data received via the video call according to the reception authentication information of a called-party mobile terminal, and transmitting the created video message using a preset transmission method according to a reception state of the called-party mobile terminal; and a database for storing and managing the created video message for the calling-party mobile terminal in an associated manner.

A method of supporting a video message service according to still another aspect of the present invention, comprising the steps of: receiving video data via the connected video call according to the reception authentication information of a called-party mobile terminal, when a calling-party mobile terminal is connected via a video call; creating a video message having a preset size based on the received video data; and transmitting the created video message, having the preset size, using a preset transmission method according to a reception state of the called-party mobile terminal.

DESCRIPTION OF REFERENCE NUMERALS OF PRINCIPAL ELEMENTS IN THE DRAWINGS

Figure 1:
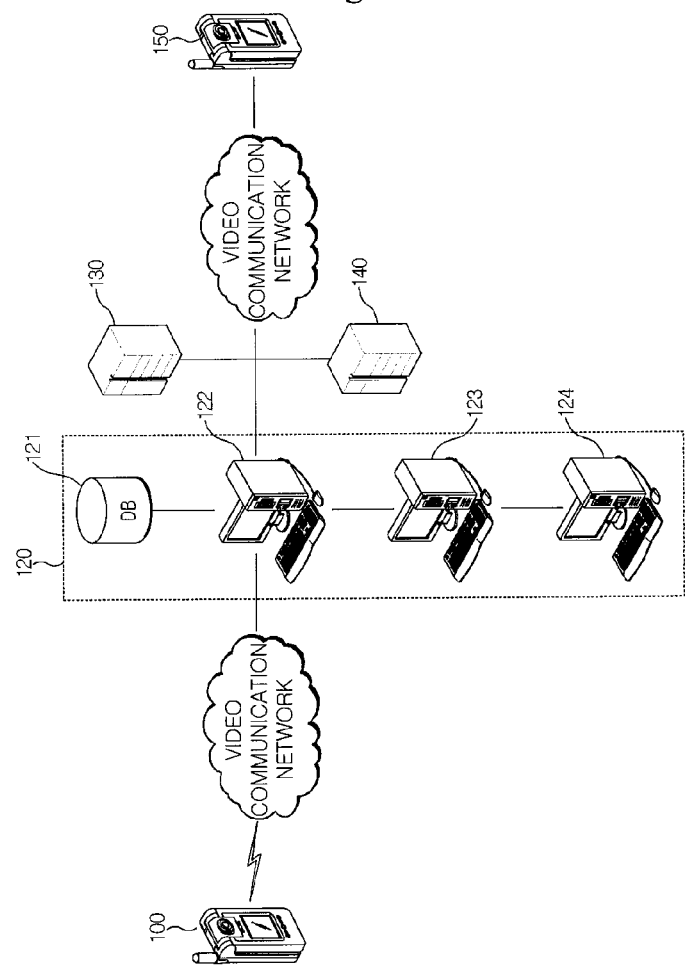
FIG. 1 is a view showing an example of the schematic configuration of a system according to an embodiment of the present invention.

110: calling-party mobile terminal
120: video message center
121: database
122: video message server
123: first Internet server
124: second Internet server
130: authentication server
140: MMSC
150: called-party mobile terminal

MODE FOR INVENTION

A system and method for supporting a video message service according to an embodiment of the present invention will be described in detail with reference to the attached drawings, that is, FIGS. 1 to 7.

The present invention proposes a method of efficiently providing a video message in conformity with the reception state of a mobile terminal.

That is, the present invention can provide one of video message service scenarios, which are different from each other, according to the authentication information of a calling-party mobile terminal, and can selectively transmit a video message to a mobile terminal via an outbound call or using a Multimedia Message Service (MMS) message according to the reception state of the called-party mobile terminal.

As shown in FIG. 1, a system for supporting a video message service according to the present invention may include a calling-party mobile terminal 110, a video message center 120, an authentication server 130, a Multimedia Message Service Center (MMSC) 140, and a called-party mobile terminal 150.

The calling-party mobile terminal 110 can connect a video call to the video message center 120 for supporting a video message service, using "hotkey+Send key" or "hotkey+called number+Send key".

The video message center 120 may include a database 121, a video message server 122, a first Internet server 123, and a second Internet server 124.

The database 121 can store and manage a created video message and a received video message in association with each other for the respective calling-party/called-party mobile terminals.

When the calling-party mobile terminal 110 is connected via the video call, the video message server 122 can provide one of video message service scenarios, which are different from each other, according to the authentication information of the calling-party mobile terminal (hereinafter referred to as 'sending authentication information'), and can then receive a preset size of a video data from the calling-party mobile terminal 110 via the connected video call according to the authentication information of the called-party mobile terminal 150 (hereinafter referred to as 'reception authentication information').

Here, the video message service scenarios may mean functions of recording, transmitting, playing, and editing a video message. Further, the sending authentication information may mean, for example, the name of the model of a calling-party mobile terminal, which allows checking of whether the video message service is supported. The reception authentication information may mean information about the function or performance of the called-party mobile terminal 150, that is, information about whether the reception of the video message is possible and information about a video message size for which reception is possible.

The video message server 122 can create a video message having a preset size based on the provided video data. Therefore, the video message server 122 can transmit the created video message using a predetermined method according to the reception state of the called-party mobile terminal.

When the calling-party mobile terminal is connected via the wireless Internet, the first Internet server 123 can provide video messages stored in the database 121 to the calling-party mobile terminal.

When the calling-party mobile terminal is connected via the wired Internet, the second Internet server 124 can provide video messages stored in the database 121 to the calling-party mobile terminal.

Here, the first Internet server 123 and the second Internet server 124 enable a user to play, edit, and transmit the stored video messages when the user accesses them. Although the first Internet server 123 and the second Internet server 124 can be implemented as separate physical entities in conformity with a wired/wireless Internet service, they can also be implemented as a single Internet server.

Since, before a video message is created, the authentication server 130 performs an authentication procedure on the calling-party/called-party mobile terminals 110 and 150 for transmitting/receiving a video message, the authentication server 130 can provide sending/reception authentication information based on the results of the authentication procedure to the video message center 120.

The MMSC 140 can receive a video message created by the video message center 120 according to the reception state of the called-party mobile terminal 150. Therefore, the MMSC 140 can create a predetermined MMS message including the provided video message and transmit the created MMS message to the called-party mobile terminal 150.

The called-party mobile terminal 150 can receive and play the video message.

Here, the calling-party/called-party mobile terminals may include all devices capable of performing video communication, and may include the concepts of a Personal Digital Assistant (PDA), a notebook computer, and a mobile phone.

As described above, since the calling-party mobile terminal simply accesses the video message center for supporting a video message service using a Send key and then records and transmits a video message, the present invention can improve the convenience of a user who uses the video message service.

Further, since the reception authentication information of a called-party mobile terminal which will receive a video message is received before the video message is created, and then the video message having a preset size is created or recorded, the present invention can flexibly adjust the size of the video message.

Figure 2:
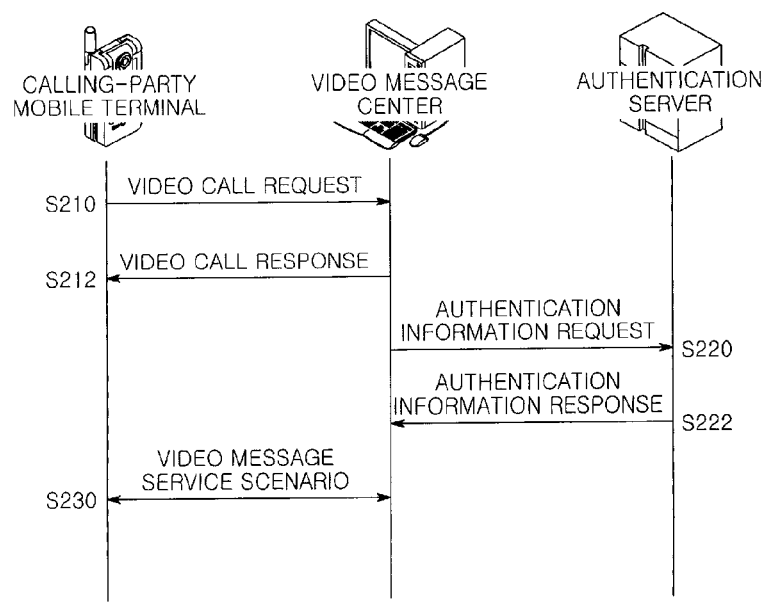
FIG. 2 is a view showing an example of a principle of providing a video message service according to an embodiment of the present invention.

FIG. 2 is a view showing an example of a principle of providing the video message service according to an embodiment of the present invention.

As shown in FIG. 2, when a user presses hotkey+Send key or hotkey+called number+Send key, the calling-party mobile terminal can create a video call request message used to request a video call, and can transmit the created video call request message to the video message center at step S210.

The video message center can receive the video call request message.

The video message center can create a video call response message in response to the received video call request message, and can transmit the created video call response message to the calling-party mobile terminal at step S212. Therefore, the video call can be connected between the calling-party mobile terminal and the video message center.

When the video call is connected, the video message center can create an authentication information request message, used to request sending authentication information corresponding to a calling party number, and can transmit the created authentication information request message to the authentication server at step S220.

The authentication server can perform an authentication procedure on the calling-party mobile terminal based on the authentication information request message, create an authentication information response message, including authentication information, based on the results of the authentication procedure, and transmit the created authentication information response message to the video message center at step S222.

The video message center can receive the authentication information response message. The video message center can provide one of video message service scenarios, which are different from each other, to the calling-party mobile terminal according to the sending authentication information, for example, a model name, included in the received authentication information response message at step S230.

For example, the video message center can provide a first video message service scenario, including service items, such as recording/transmission, sent video box, received video box and utilization guidance, to a mobile terminal equipped with application or software for supporting the video message service based on the model name of the mobile terminal capable of performing video communication, and can provide a second video message service scenario, including restricted service items, such as recording/transmission, to a mobile terminal which is not equipped with the application or software.

Here, a reference, used to determine the video message service scenarios which are different from each other, is not limited to the number of service items, but various factors, such as a method of displaying the service items and a method of changing the service items, which can be provided through separate application or software can be applied. The method of displaying service items will be described with reference to FIGS. 3 to 4.

Figure 3:
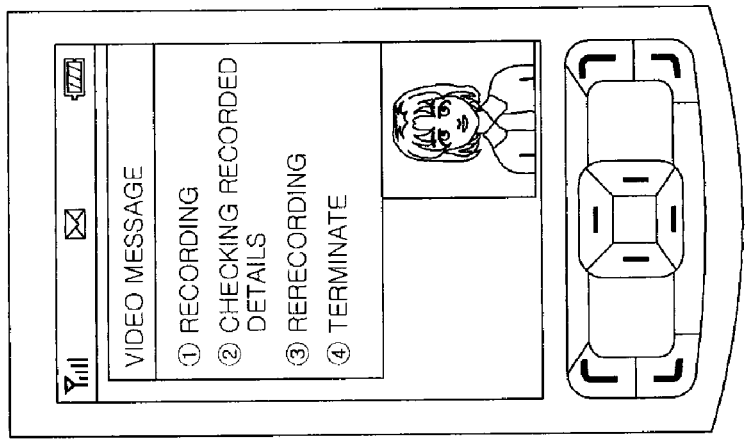
FIG. 3 is a view showing a first example of a method of displaying service items according to an embodiment of the present invention.
Figure 3:
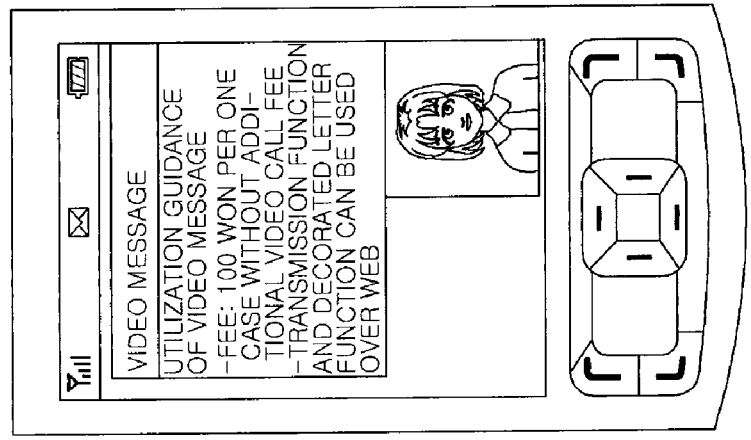
Figure 3:
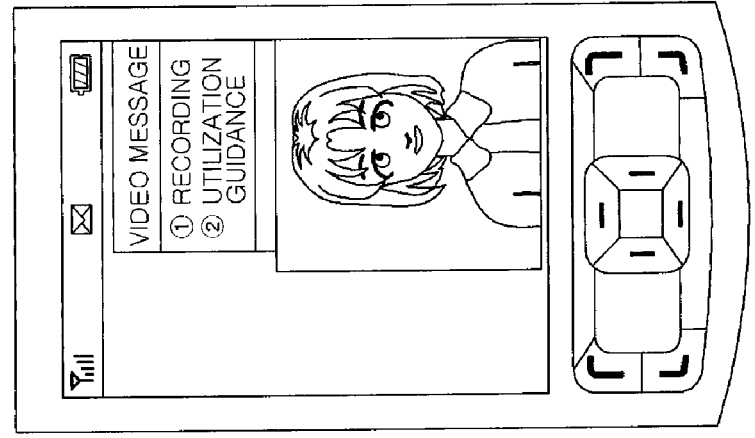

FIG. 3 is a view showing a first example of a method of displaying service items according to an embodiment of the present invention.

As shown in FIG. 3, a calling-party mobile terminal, equipped with an application or software, provides a screen having service items, such as 1) recording, 2) utilization guidance 3) and transmission, together with a video screen. When '2) utilization guidance' is selected or recording is completed by a user, it can be seen that the screen corresponding to the corresponding service item becomes large. This can be supported by the installed application or software.

Figure 4:
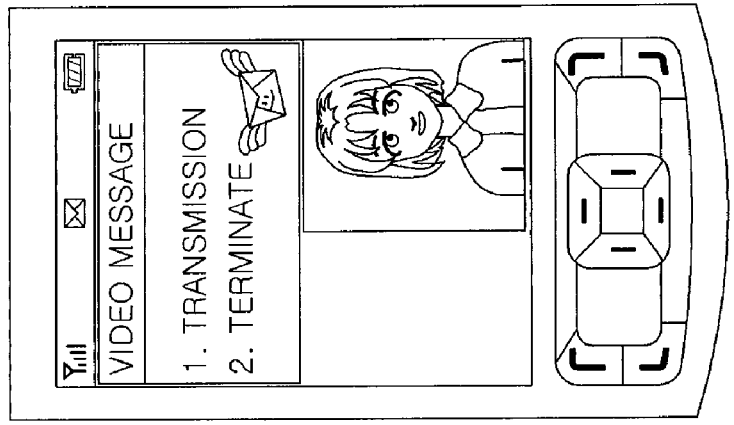
FIG. 4 is a view showing a second example of a method of displaying service items according to an embodiment of the present invention.
Figure 4:
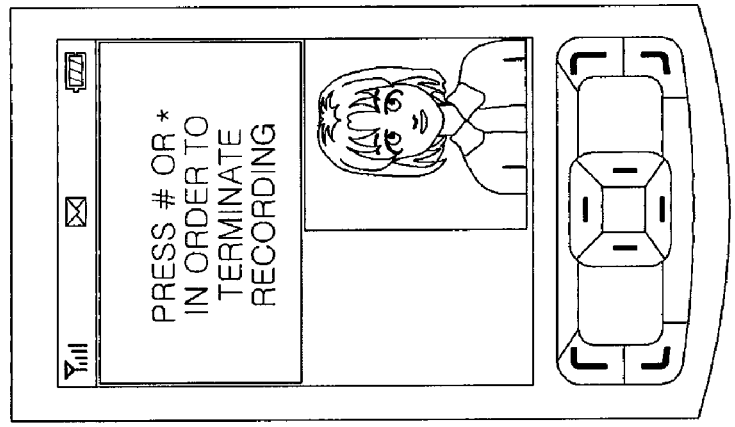
Figure 4:
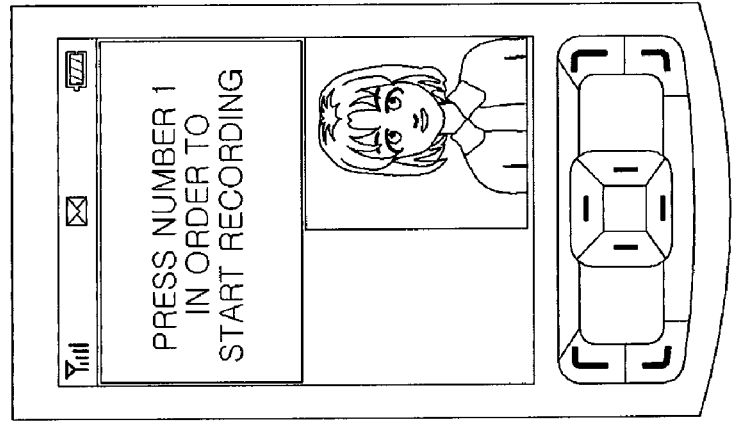

FIG. 4 is a view showing a second example of a method of displaying service items according to an embodiment of the present invention. As shown in FIG. 4, although a calling-party mobile terminal, which is not equipped with an application or software, provides a screen having service items, such as 1) start recording, 2) terminate recording, and 3) transmission, together with a video screen, it can be seen that the video message service can be recorded and then transmitted using a screen, displayed when video communication is performed, in the state in which the screen is not changed.

In order to provide a basic video message service not only to a mobile terminal of a company, in which application or software is installed and which provides different types of User Interfaces (UIs) in conformity with the service items included in a video message service scenario, but also to mobile terminals of the corresponding company or the other companies, in which application or software is not installed, the present invention can provide additional video message service scenarios.

Since the present invention authenticates a calling-party mobile terminal accessing the video message center and provides one of the video message service scenarios, which are different from each other, based on the results of the authentication, the present invention can provide a video message service regardless of the type of mobile terminal.

Here, the video message center can receive the sending authentication information by requesting it from the authentication server or directly receiving it from the calling-party mobile terminal.

Further, the present invention sends video data via an outbound call or using an MMS message in conformity with the reception state of the called-party mobile terminal. The reception state may include the standby state, call state, and reception-disabled state of the called-party mobile terminal, which are used to determine whether to send a video message. These states will be separately described with reference to FIGS. 5 and 6.

Figure 5:
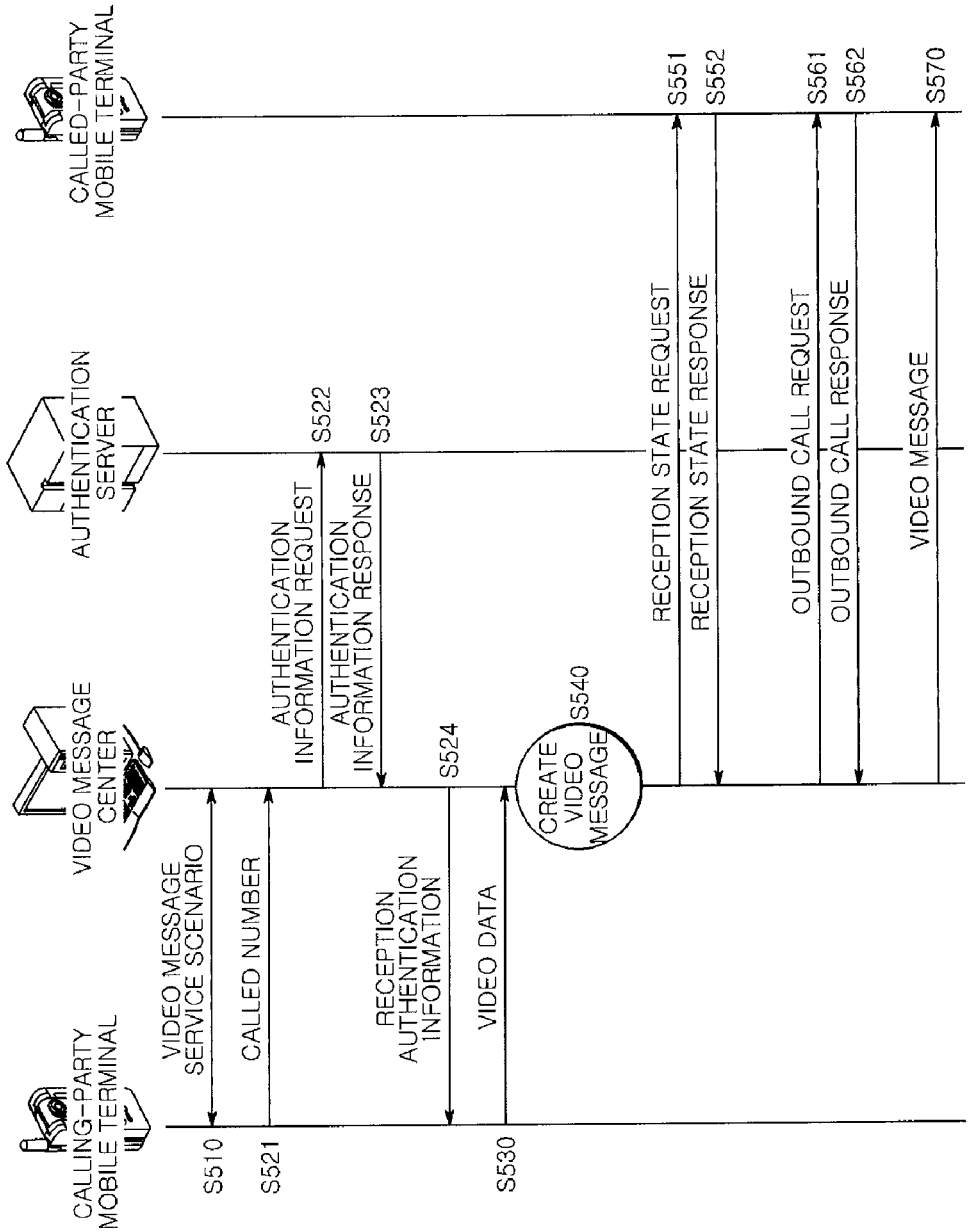
FIG. 5 is a first flowchart showing a method of providing a video message service according to an embodiment of the present invention.

FIG. 5 is a first flowchart showing a method of providing a video message service according to an embodiment of the present invention.

As shown in FIG. 5, when a calling-party mobile terminal is connected with a video message center via a video call, the calling-party mobile terminal receives a video message service scenario at step S510. Therefore, the calling-party mobile terminal can input the called number of a called-party mobile terminal from a user according to the video message service scenario. The calling-party mobile terminal can supply the called number of the called-party mobile terminal to the video message center at step S521.

The video message center can receive the called number, create an authentication information request message, used to request the reception authentication information of the called-party mobile terminal, which corresponds to the received called number, and send the created authentication information request message to the authentication server at step S522.

When the authentication server receives the authentication information request message, the authentication server can perform an authentication procedure for the called-party mobile terminal. Therefore, the authentication server can create an authentication information response message, including the reception authentication information of the called-party mobile terminal, based on the results of the authentication procedure, and can send the created authentication information response message to the video message center at step S523.

Accordingly, the video message center can receive the authentication information response message, and can provide the reception authentication information, included in the received authentication information response message, to the calling-party mobile terminal along with a guidance announcement at step S524.

Here, expressions, for example, 'The mobile terminal of a receiver can receive a video message of 40 seconds'?or 'The mobile terminal of a receiver does not support video message service', can be used as the guidance announcement according to the reception authentication information.

The calling-party mobile terminal can transmit video data, captured by a camera, to the video message center via the connected video call in real time based on the guidance announcement at step S530.

The video message center can receive the video data from the calling-party mobile terminal. That is, the video message center can record the received video data, and create a video message, having a preset size, corresponding to the reception authentication information of the called-party mobile terminal at step S540.

The video message center can transmit the created video message according to the reception state of the called-party mobile terminal. For this purpose, the video message center can create a reception state request message used to request the reception state, and can transmit the created reception state request message to the called-party mobile terminal at step S551.

The called-party mobile terminal can receive the reception state request message. The called-party mobile terminal can create a reception state response message used to indicate its reception state, for example, a standby state or a call state, in response to the received reception state request message, and can transmit the created reception state response message to the video message center at step S552.

Here, if the video message center receives no response from the called-party mobile terminal, the video message center may determine that the called-party mobile terminal is in a reception-disabled state.

The video message center can receive the reception state response message. The video message center can check the reception state of the called-party mobile terminal based on the reception state response message.

If the reception state of the called-party mobile terminal is a standby state, the video message center can create an outbound call request message used to request an outbound call from the called-party mobile terminal, and can transmit the created outbound call request message to the called-party mobile terminal at step S561.

The called-party mobile terminal can receive the outbound call request message. The called-party mobile terminal can create an outbound call response message in response to the outbound call request message, and can transmit the created outbound call response message to the video message center at step S562.

Accordingly, an outbound call can be connected between the video message center and the called-party mobile terminal.

Finally, the video message center can transmit the created video message to the called-party mobile terminal via the connected outbound call at step S570. The called-party mobile terminal can play the received video message in real time.

Figure 6:
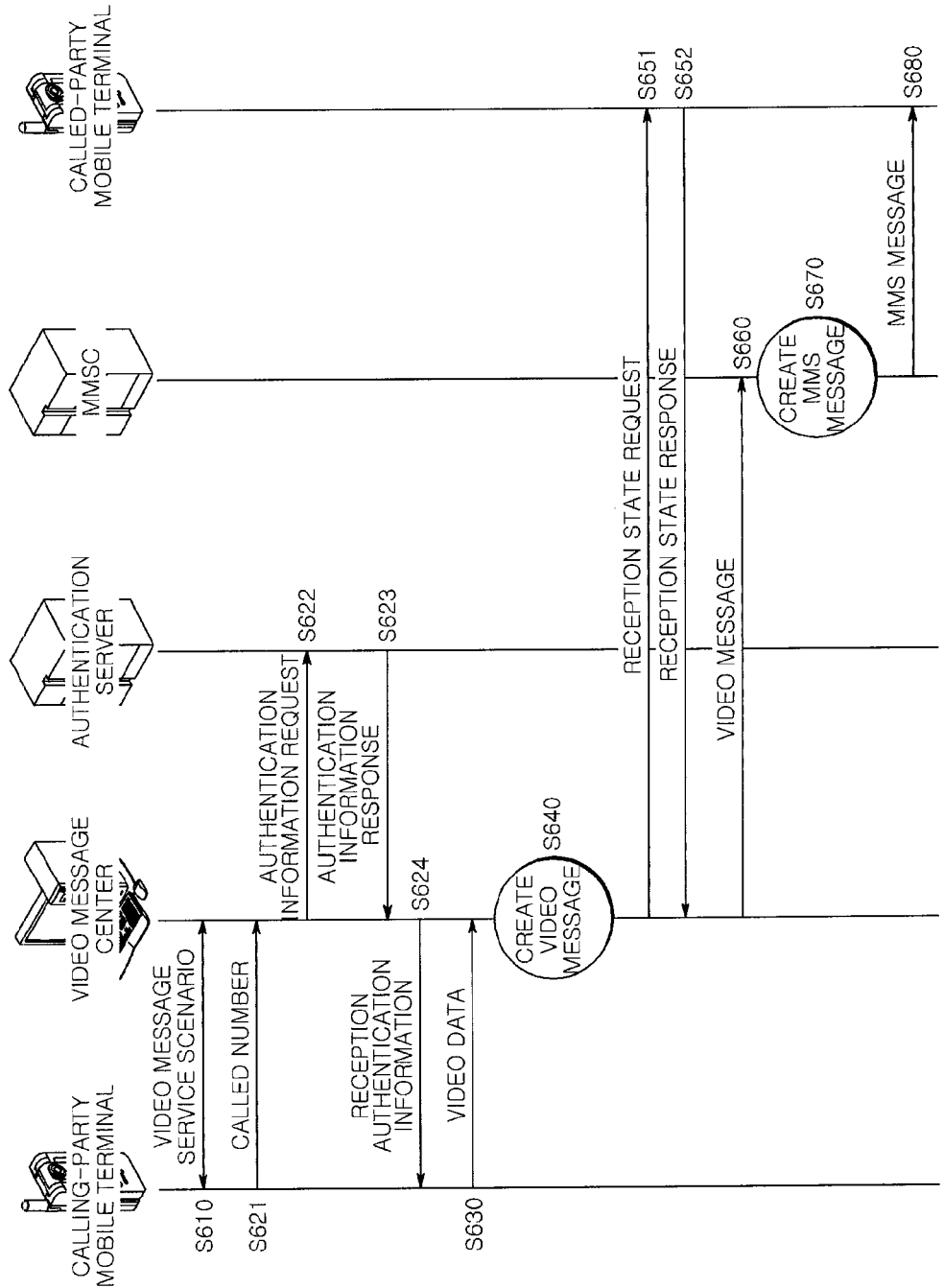
FIG. 6 is a second flowchart showing a method of providing a video message service according to an embodiment of the present invention.

FIG. 6 is a second flowchart showing a method of providing a video message service according to an embodiment of the present invention.

Here, since the process performed before the video message center checks the reception state of the called-party mobile terminal is the same as the description which has been given in connection with FIG. 5, a description thereof will be omitted hereinafter.

As shown in FIG. 6, if the reception state of the called-party mobile terminal is a call state or a reception-disabled state, the video message center can transmit the created video message to an MMSC at step S660.

The MMSC can receive a video message from a video message center. The MMSC can create a predetermined MMS message, including the video message, based on the received video message at step S670.

Finally, the MMSC can transmit the created MMS message to a called-party mobile terminal at step S680. The called-party mobile terminal can check a video message using the received MMS message.

As described above, since the present invention checks the reception state of the called-party mobile terminal before transmitting the video message and then transmits the created video message using an outbound call or an MMS message according to the reception state, the present invention can effectively transmit a video message.

In order to provide the video message service, the video message center can construct the video message service scenario or the video message mail box for respective subscribers, can provide them. Various menu items corresponding to the provided video message mail box will be described with reference to FIG. 7.

Figure 7:
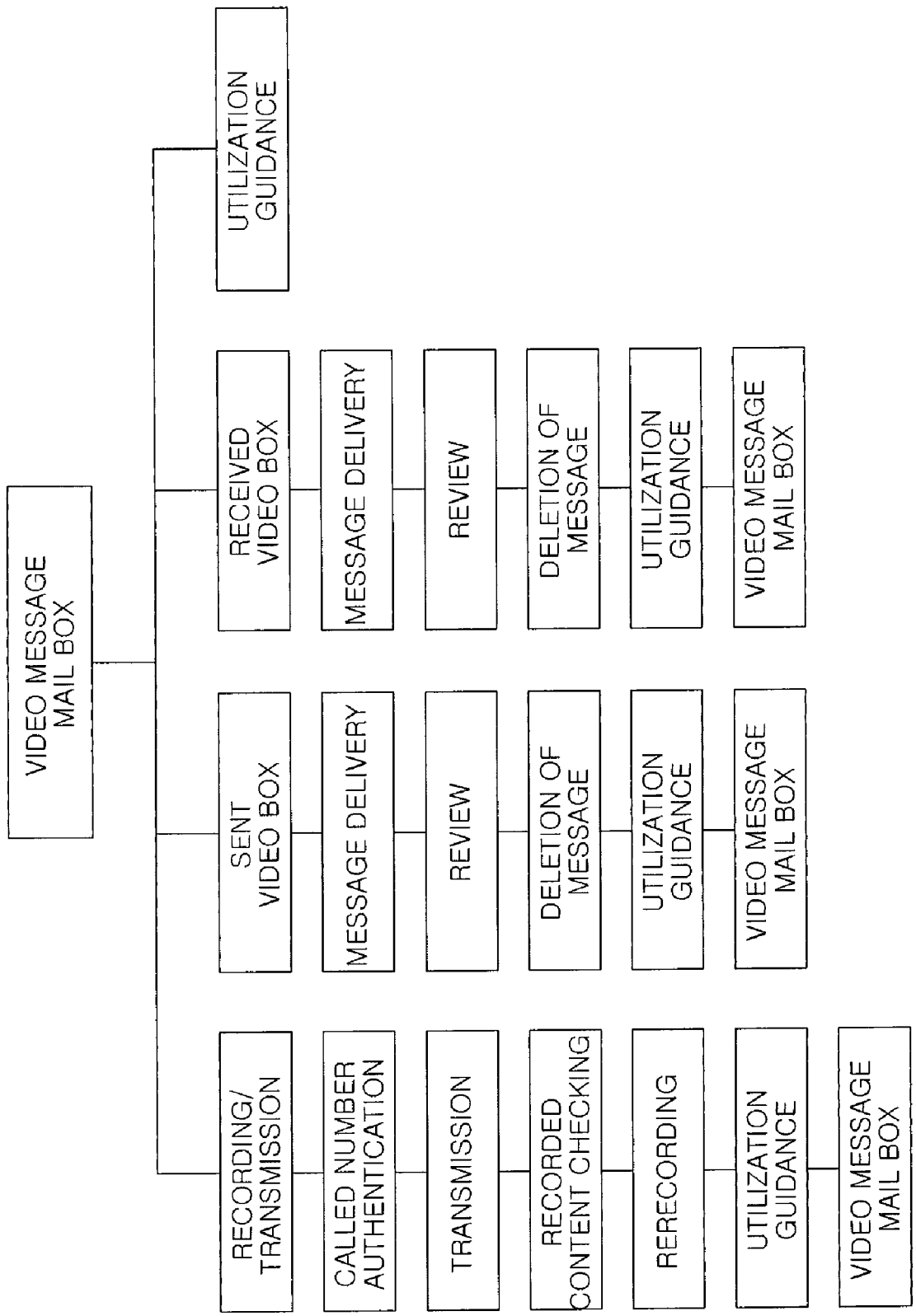
FIG. 7 is a view showing an example of a video message mail box according to an embodiment of the present invention.

FIG. 7 is a view showing an example of a video message mail box according to an embodiment of the present invention.

As shown in FIG. 7, the video message mail box provided by the video message center may include items, such as recording/transmission, sent video box, received video box, and utilization guidance.

The mobile terminal can directly access the recording/transmission item using hotkey+called number+Send key. The recording/transmission item may include, for example, called number authentication, transmission, checking recorded contents, rerecording, utilization guidance, and a video message mail box.

Meanwhile, the mobile terminal can access the video message mail box using hotkey+Send key.

Here, various menu items, provided from the video message mail box, can be provided to a mobile terminal, which uses the video message mail box, together with predetermined guidance announcement.

The system and method for supporting a video message service according to the present invention can be modified and applied in various forms within the scope of the technical spirit of the present invention, and is not limited to the above-described embodiments. Further, the preferred embodiments and drawings of the present invention have been disclosed not for the purpose of limiting the scope of the technical spirit of the present invention but for the purpose of describing the present invention in detail.

In the above-described present invention, since it will be understood by those skilled in the art that various substitutions, modifications, and changes may be made without departing from the technical spirit of the invention, the present invention is not limited to the embodiments and attached drawings, and the scope of the present invention must be determined by including all the following claims and equivalents.

The invention claimed is:

1. A system for supporting a video message service, comprising:
   a video message center configured to, when a calling-party mobile terminal is connected via a video call, check sending authentication information of the calling-party mobile terminal, provide a preset video message service scenario based on results of the checking, create a video message having a preset size based on video data received via the video call according to reception authentication information of the called-party mobile terminal, and transmit the created video message using a preset transmission method according to a reception state of the called-party mobile terminal; and an authentication server configured to perform an authentication procedure on the called-party mobile terminal so as to transmit the video message, and provide the reception authentication information, based on results of the authentication procedure, to the video message center.

2. The system according to claim 1, wherein the reception authentication information comprises at least one of information about whether reception of the video message is possible and information about an available video message size for the video message.

3. The system according to claim 1, wherein the reception state is one of a standby state, a call state, and a reception-disabled state of the called-party mobile terminal, which are used to determine whether to transmit the video message.

4. The system according to claim 1, wherein, if the reception state of the called-party mobile terminal corresponds to a standby state, the video message center transmits the created video message to the called-party mobile terminal via an outbound call.

5. The system according to claim 1, wherein, if the reception state of the called-party mobile terminal corresponds to a call state or a reception-disabled state, the video message center transmits the created video message to the called-party mobile terminal using a Multimedia Message Service (MMS) message.

6. The system according to claim 1, further comprising a Multimedia Message Service Center (MMSC) configured to, when the video message is received from the video message center according to the reception state of the called-party mobile terminal, create an MMS message, including the provided video message, and transmit the MMS message to the called-party mobile terminal.

7. The system according to claim 1, wherein the sending authentication information comprises a name of a model of the calling-party mobile terminal, which is used to determine whether the video message service is supported.

8. A system for supporting a video message service, comprising:

a video message server configured to, when a calling-party mobile terminal is connected via a video call, check sending authentication information of the calling-party mobile terminal, provide a preset video message service scenario based on results of the checking, create a video message having a preset size based on video data received via the video call according to reception authentication information of the called-party mobile terminal after providing the video message service scenario, and transmit the created video message using a preset transmission method according to a reception state of the called-party mobile terminal; and a database configured to store and manage the created video message for the calling-party mobile terminal in an associated manner.

9. The system according to claim 8, further comprising one or more Internet servers configured to, if the calling-party mobile terminal is connected via a wireless or wired Internet, provide the video message stored in the database to the calling-party mobile terminal.

10. The system according to claim 8, wherein the calling party mobile terminal is configured to connect the video call to the video message server using a hot key and a Send key or the hot key, a called number, and the Send key.

11. The system according to claim 10, wherein the calling party mobile terminal is configured to directly access an item for recording/transmission of the video message belonging to one or more items included in a video message mail box provided by the video message server using the hotkey, the called number, and the Send key.

12. The system according to claim 8, wherein the calling-party/called-party mobile terminals include any type of devices capable of performing video communication via the video call, which includes one of Personal Digital Assistants (PDAs), notebook computers, and mobile phones.

13. A method of supporting a video message service, comprising:

checking sending authentication information of a calling-party mobile terminal;

providing a preset video message service scenario based on results of the checking if the calling-party mobile terminal is connected via a video call;

requesting reception authentication information of the called-party mobile terminal to an authentication server;

receiving the reception authentication information of the called-party mobile terminal;

receiving video data from the calling-party mobile terminal via the connected video call according to the received reception authentication information of a called-party mobile terminal;

creating a video message having a preset size based on the received video data; and transmitting the created video message, having the preset size, using a preset transmission method according to a reception state of the called-party mobile terminal.

14. The method according to claim 13, wherein the receiving video data comprises:

requesting authentication information of the called party mobile terminal to the authentication server, when the calling-party mobile terminal is connected via the video call;

receiving the authentication information of the called-party mobile terminal from the authentication server; and receiving a preset size of the video data from the calling-party mobile terminal via the connected video call according to the authentication information of the called-party mobile terminal.

15. The method according to claim 13, wherein the transmitting the video message comprises:

checking the reception state of the called-party mobile terminal so as to transmit the created video message; and transmitting the video message to the called-party mobile terminal via an outbound call according to the checked reception state of the called-party mobile terminal.

16. The method according to claim 13, wherein the transmitting the video message comprises:

checking the reception state of the called-party mobile terminal so as to transmit the created video message; and transmitting the video message to an MMSC according to the checked reception state of the called-party mobile terminal, wherein, the MMSC creates an MMS message including the received video message and transmits the created MMS message to the called-party mobile terminal.

17. The method according to claim 15, wherein the checking the reception state comprises:

requesting the reception state to the called-party mobile terminal; and receiving the reception state from the called-party mobile terminal.

18. The method according to claim 13, wherein the preset video message service scenario differs in at least one of a number of service items, a method of displaying the service items, and a method of changing between the service items being provided through an application or software installed in the calling-party mobile terminal.

* * * * *